United States Patent
Liebsch

(10) Patent No.: US 10,398,227 B2
(45) Date of Patent: Sep. 3, 2019

(54) PIECE OF FURNITURE WITH SENSOR DEVICE

(71) Applicant: Grass GmbH, Hoechst (AT)

(72) Inventor: Ronald Liebsch, Primisweiler (DE)

(73) Assignee: Grass GmbH, Hoechst (AT)

(*) Notice: Subject to any disclaimer, the term of this patent is extended or adjusted under 35 U.S.C. 154(b) by 0 days.

(21) Appl. No.: 15/430,886

(22) Filed: Feb. 13, 2017

(65) Prior Publication Data

US 2017/0181545 A1 Jun. 29, 2017

Related U.S. Application Data

(63) Continuation of application No. PCT/EP2015/068880, filed on Aug. 18, 2015.

(30) Foreign Application Priority Data

Jul. 21, 2014 (DE) .................. 20 2014 103 874

(51) Int. Cl.
*A47B 97/00* (2006.01)
*A47B 88/457* (2017.01)
(Continued)

(52) U.S. Cl.
CPC ............ *A47B 88/457* (2017.01); *A47B 97/00* (2013.01); *E05F 15/73* (2015.01); *G01V 3/088* (2013.01);
(Continued)

(58) Field of Classification Search
CPC ....... A47B 88/457; A47B 97/00; E05F 15/73; G01V 3/088
(Continued)

(56) References Cited

U.S. PATENT DOCUMENTS 6,025,726 A 2/2000 Gershenfeld et al.
7,087,148 B1 * 8/2006 Blackburn ............ B82Y 30/00
204/403.06
(Continued)

FOREIGN PATENT DOCUMENTS

AT 414 004 B 8/2006
DE 10 2008 023 962 B3 1/2010
(Continued)

OTHER PUBLICATIONS

English translation of the International Preliminary Report on Patentability (Application No. PCT/EP2015/068880) dated Feb. 21, 2017.

(Continued)

*Primary Examiner* — James O Hansen
(74) *Attorney, Agent, or Firm* — Burr & Brown, PLLC

(57) ABSTRACT

A piece of furniture with a sensor device is provided. The sensor device includes an electrode arrangement which is arranged on a furniture section of the piece of furniture. The electrode arrangement, which is located at one side of the piece of furniture, detects changes in an electric field in a surrounding region with or without touching the electrode arrangement or the piece of furniture. The sensor device includes a detection unit, wherein a position of a body in the surrounding region of the piece of furniture is determined by a detected change in the electric field.

12 Claims, 2 Drawing Sheets

(51) Int. Cl.
*E05F 15/73* (2015.01)
*G01V 3/08* (2006.01)

(52) U.S. Cl.
CPC .......... *A47B 2200/0056* (2013.01); *A47B 2220/0091* (2013.01); *E05Y 2400/44* (2013.01); *E05Y 2400/852* (2013.01); *E05Y 2900/20* (2013.01)

(58) Field of Classification Search
USPC .......... 312/319.5, 319.1, 319.2, 326
See application file for complete search history.

(56) References Cited

U.S. PATENT DOCUMENTS

| | | | | |
|---|---|---|---|---|
| 2010/0116682 A1* | 5/2010 | Neuzil | .............. | G01N 27/403 |
| | | | | 205/419 |
| 2010/0277040 A1* | 11/2010 | Klee | .............. | B06B 1/0292 |
| | | | | 310/324 |
| 2012/0286802 A1 | 11/2012 | Kaltner et al. | | |
| 2013/0050139 A1 | 2/2013 | Güte | | |
| 2013/0081434 A1* | 4/2013 | Grant | .............. | E05B 47/026 |
| | | | | 70/1.5 |
| 2013/0320467 A1* | 12/2013 | Buchanan | .............. | G01N 29/022 |
| | | | | 257/419 |

FOREIGN PATENT DOCUMENTS

| | | |
|---|---|---|
| DE | 10 2009 052 537 A1 | 5/2011 |
| DE | 10 2009 057 947 A1 | 6/2011 |
| DE | 20 2010 005 412 U1 | 9/2011 |
| DE | 10 2011 050 538 A1 | 11/2012 |
| WO | 97/41458 A1 | 11/1997 |
| WO | 2005/079630 A1 | 9/2005 |
| WO | 2007/124754 A2 | 11/2007 |

OTHER PUBLICATIONS

German Search Report (Application No. 20 2014 103 874.4) dated Jul. 24, 2015.
International Search Report and Written Opinion (Application No. PCT/EP2015/068880) dated Oct. 29, 2015.
Chinese Office Action (with English translation), Chinese Application No. 201580044374.6, dated Sep. 4, 2018 (13 pages).

* cited by examiner

PIECE OF FURNITURE WITH SENSOR DEVICE

CROSS REFERENCE TO RELATED APPLICATIONS

This application is a continuation of International Application No. PCT/EP2015/068880 filed Aug. 18, 2015, which designated the United States, and claims the benefit under 35 USC § 119(a)-(d) of German Application No. 20 2014 103 874.4 filed Aug. 21, 2014, the entireties of which are incorporated herein by reference.

FIELD OF THE INVENTION

The present invention relates to a piece of furniture with a sensor device.

BACKGROUND OF THE INVENTION

In the field of furniture making, the use of sensor devices to control a function of a piece of furniture in various embodiments is known. Corresponding sensor devices can be connected electrically or electronically with, for example, an actuator such as, for example, a drive unit. The actuator can be provided to move a movable part of the piece of furniture such as, for example, a door, a drawer or a furniture flap. The sensor device can, equally, be provided for an operation of a locking device. A sensor device is here frequently provided for a single furniture section of a piece of furniture which is movable or whose state can be changed in some other respect. Embodiments are, however, also known in which a sensor device is provided for a plurality of often similar furniture sections, wherein the sensor device comprises a monitoring region which can be divided into a plurality of partial regions for monitoring by the sensor device, in order to assign one of the furniture sections to each partial region. An actuating action, for example, reaching into a corresponding partial region can be converted by the sensor device into an actuation signal for an actuator of an associated furniture section, in order to actuate the furniture section. The actuation can, for example, be an opening and closing of a drawer.

The present invention is based on the object of providing a piece of furniture that is designed for a comparatively easy and, in particular, contact-free, actuation in an unobtrusive and space-saving manner.

The present invention starts on the basis of a piece of furniture with a sensor device. The heart of the invention is that the sensor device comprises an electrode arrangement which is arranged on a furniture section of the piece of furniture in such a way that, by using the electrode arrangement, changes in an electric field in a surrounding region, which is located at one side of the piece of furniture, can be detected with or without contacting the electrode arrangement or the piece of furniture, and that the sensor device comprises a detection unit by means which a position of a body in the surrounding region of the piece of furniture can be determined by means of a detected change of the electric field. The electrode arrangement can here comprise one or a plurality of electrodes consisting of an electrically conductive material, a metal, for example.

The electrodes are provided for the detection of a change of an electric field in the surrounding region when a dielectric body is moved into or out of the surroundings of the electrodes. The present invention offers the advantage that as a result a simple and space-saving solution can be implemented, in particular, for contact-free actuation.

The present invention is based on the recognition that the human body—in part due to its high water content—can comparatively easily be electrically polarized in a static electric field. In a free region of space that is filled by an electrostatic field, a bodily part of a person can therefore measurably or detectably change an electrostatic field distribution. A bodily part is therefore suitable as a dielectric, polarizable body whose position in the surrounding region of the piece of furniture can be determined or detected. The electrode arrangement is here preferably geometrically constructed in such a way that a plurality of different positions of the bodily part can be distinguished, and, in particular, determined quantitatively, where appropriate with reference to the electrode arrangement, through a corresponding influence on the electric field distribution. A piece of furniture according to the present invention can thus advantageously be designed for actuation with contact and for contact-free actuation.

For the purpose of a contact-free actuation, an electric field distribution can be provided at the piece of furniture which extends with a field strength beyond an outer surface of the furniture section into a surrounding region located in particular outside the piece of furniture. A field change generated by a body, e.g. by a human bodily part, can thus be detected with the electrode arrangement, without contacting or reaching into the piece of furniture being necessary.

A corresponding change to the electric field can here generate a change to a charge at one or a plurality of electrodes of the electrode arrangement. A change to a charge state at one or a plurality of electrodes can be measurable and detectable with the detection unit, for example, making use of currents. Preferably the detection unit is designed in such a way that changes in the state of the electrodes of the electrode arrangement—for example, changes of their charge—can be evaluated with it, and can be communicated, for example, in the form of signals, in particular digital data, to, for example, a control device or, for example, to an actuator such as, for example, an electric drive.

One electrode of the electrode arrangement is preferably manufactured from an electrically conductive material, which can, for example, be a metal, a semiconductor, a plastic or, if appropriate, also a combination of a plurality of different conductive materials. The material can, for example, have a crystalline structure or also, for example, be an amorphously ordered plastic material.

One electrode of the electrode arrangement can be provided as a probe electrode for detecting the electric field distribution in the surrounding region. In order to determine an electric field distribution and, if relevant, its change, with relative precision, the electrode arrangement preferably comprises a plurality of probe electrodes, in particular, arranged separately from each other.

A preferred embodiment of the present invention consists in that a plurality of the probe electrodes can be connected individually to the detection unit for separate detection. A precision of the position determination can be increased through this.

A plurality of the electrodes, in particular, the probe electrodes, can here be indirectly in contact with one another through the detection unit, where each electrode is connected individually to the detection unit.

An electrode of the electrode arrangement can be adapted to a detection connection of the detection unit in such a way that the electrode can be electrically connected directly to the detection unit. Preferably all the electrodes of the electrode arrangement are designed in this way.

An electrode of the electrode arrangement can be designed as a comparatively thin, in particular, flat element, for example, in the form of a plate, and, in particular, of a foil.

It is furthermore preferred for the electrode arrangement to comprise at least one field electrode which is provided to generate an electric field in the surrounding region at the side of the piece of furniture. An electric field with reference to a reference potential in a surrounding region of the piece of furniture, for example, a ground potential of a room or building, can be created with a field electrode. A plurality of field electrodes can be provided here, which if appropriate can be placed at the same or at different electric potentials. In this way influences from the surroundings which could bring about an unfavorable field distribution can be compensated for. An additional field electrode for connection to a ground potential can, for example, be provided.

Preferably the field electrode can be connected for charging to the detection unit. The field strength can in this way be adjusted, and, for example, controlled or regulated, by the detection unit.

A further preferred embodiment of the present invention consists in that the electrode arrangement comprises a carrier element to which the probe electrodes are attached, separated from one another by electrically insulating material. The carrier element can, for example, be a plate-like, rigid body or, for example, a flexible foil which can, if appropriate, be stretched elastically. The electrodes can be attached to it individually or, for example, attached by coating onto a carrier material. The electrode arrangement can in this way be formed as an assembly or as an individual component which can be comparatively easily mounted. The field electrode is preferably attached, electrically insulated, to the carrier element, in order to avoid an influence of one of the probe electrodes on the field electrode.

A particularly preferred embodiment of the present invention consists in that the electrode arrangement is formed on a circuit board. In this way the electrode arrangement can be manufactured comparatively economically and be thin in form.

The surrounding region, which is filled by the electric field for monitoring by the electrode arrangement, is located at a preferably easily accessible side of the piece of furniture. The electrode arrangement can here be arranged on the body of the piece of furniture. The electrode arrangement can, furthermore, be arranged on a movable furniture section. The electrode arrangement can, also, be arranged on a front panel. The electrode arrangement can here be embedded in a component of the piece of furniture with planar extension, for example, in a front panel, in a door, or in a side wall. The electrode arrangement can also be embedded in a cover plate. The cover plate can, for example, be a top plate, a floor plate, a draw bottom, or a horizontally extendable plate.

The detection unit can comprise a microelectronic circuit arrangement with which a comparatively weak change in the field distribution resulting, for example, from human bodily tissue, can be reliably measured. It is, in particular, preferred that the detection unit is formed as an integrated microelectronic component, whereby the detection unit can comparatively easily and in a space-saving manner be screened from external influences, in particular, electromagnetic influences. In a comparatively simple embodiment, the detection unit can process changes at the electrodes, in particular, at the probe electrodes, in such a way that the change can be transmitted in the form, for example, of amplified and, for example, normalized signals to a further electronic unit. A comparatively advanced embodiment of the detection unit according to the prior art is available, for example, with a programmable microcontroller with integrated signal processing unit, with which a movement of the body detected by the electrode arrangement can be followed and, in addition, evaluated and processed.

Preferably, a sequence of a plurality of positions of the dielectric body can be assigned in the surrounding region of an actuation signal by the detection unit. The detection unit preferably evaluates the positions of the body relative to one another, that is to say not absolutely, wherein a movement of the body can be detected as a gesture with a plurality of different positions. Preferably the detection unit is designed for detection of a plurality of gestures, whereby each gesture can be assigned to one of a plurality of different actuation functions for its initiation and control.

A preferred embodiment of the present invention consists in that the piece of furniture comprises an actuator that is connected to a sensor device for an actuation. The actuator can, for example, be a drive motor for moving a movable furniture section, a door-opener or, for example, a locking device of the piece of furniture. For a self-contained embodiment, the sensor device can be connected directly to an actuator or to a plurality of actuators, wherein the sensor device can preferably be designed for a drive and control of the actuators with, in relevant cases, an integrated processor unit, for example, as a system-on-chip (SoC). An actuator can, moreover, be connected indirectly via a control device, for example, a separate computing unit, to the sensor device, whereby signals and, if relevant, data can be made available to not just one actuator or to an actuation or control function.

If a comparatively large number of different gestures can be detected by means of the electrode arrangement and the detection unit, a single electrode arrangement, and a single detection unit, can be employed for the actuation of a plurality of actuators and, in particular, of a plurality of movable furniture sections.

BRIEF DESCRIPTION OF THE DRAWINGS

A plurality of exemplary embodiments of the present invention are described below and explained in more detail with the aid of the drawings. The exemplary embodiments are not shown to scale in the drawings. Reference numbers are used consistently in all the figures of the drawings.

DETAILED DESCRIPTION OF THE INVENTION

Figure 1:
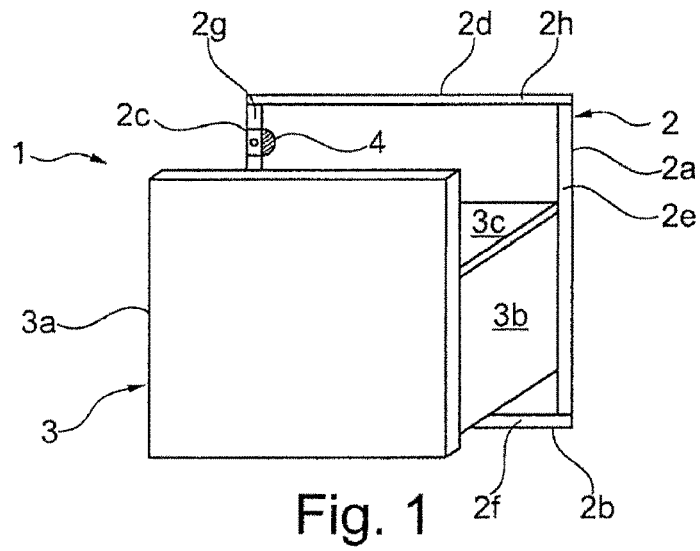
FIG. 1 shows a schematic perspective view of an excerpt of a piece of furniture according to the present invention.

An excerpt of an exemplary embodiment of a piece of furniture 1 according to the present invention is shown in FIG. 1. The excerpt of the piece of furniture 1 shows a furniture compartment 2 in which a drawer 3 is movably held for opening and closing. The furniture compartment 2 is bordered at the sides by wall elements 2a,2b, 2c and 2d.

In addition to a rear wall 3c and a side wall 3b, a front panel 3a of the drawer 3 is illustrated, the panel being able to cover, for example, faces 2e, 2f, 2g, 2h of the wall elements 2a, 2b, 2c, 2d. A sensor element 4 is attached to wall element 2c, and lies, for example, in a plane of the front faces 2g and 2e of the wall elements 2a and 2c. At least one electrode arrangement is housed in the sensor element 4, with which a body (not shown) can be detected in a detection region in front of the face 2g with the aid of the sensor element 4. The sensor element 4 can here comprise a detection unit in the form, for example, of a microcontroller, which may be adapted to the electrode arrangement.

Figure 2:
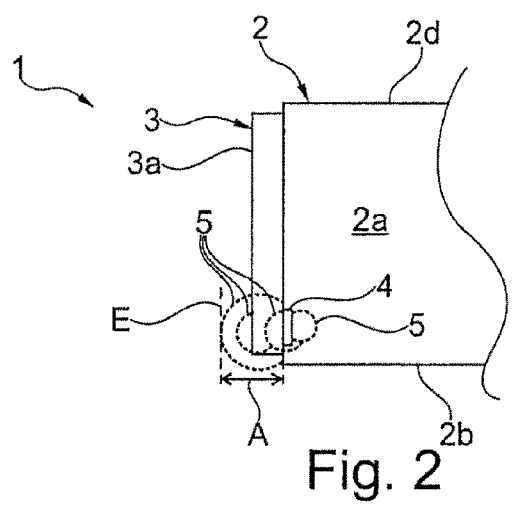
FIG. 2 shows a schematic side view of a piece of furniture according to the present invention.

A second exemplary embodiment of a piece of furniture 1 according to the invention is illustrated in FIG. 2. The piece of furniture 1 also comprises a furniture compartment 2 with a plurality of face elements 2a, 2b and 2d in which a drawer 3 is supported. The drawer 3 comprises a front panel of row A, to the inner side of which a sensor element 4 is attached. The sensor element 4 comprises at least one electrode arrangement 6, as is shown, for example, in FIG. 3. Through the attachment of the sensor element 4 to the front panel 3a, the detection region of the sensor element 4 can advantageously move along with the drawer 3. The sensor element 4 is preferably attached at a prominent position of the front panel 3a, for example, in the region of a corner or, for example, in the centre of the inner face of the front panel 3a. The detection region of the sensor element 4 is consequently easy to remember. The electrode arrangement housed in the sensor element 4 generates an electric field which is illustrated schematically in FIG. 2 with the aid of equipotential lines 5. A voltage applied to the electrode arrangement 6 thus preferably generates an electric field whose change in a plane E located at a distance A in front of the front panel 3a can be detected by the sensor element 4.

When an electrically polarizable body (not shown), for example, an electric conductor (not shown) or a bodily part (not shown), whose material exhibits a comparatively high dielectric coefficient, is introduced into the region of the electric field which is described, for example, by the equipotential line 5, the course of the electric field changes in such a way that a movement of charge that can be measured by the detection unit (not shown) can take place between the electrodes. The dielectric body can, for example, be a human bodily part such as, for example, a hand or a finger. Preferably the electrode arrangement housed in the sensor element 4 is appropriate for the size of such a bodily part, in order to largely avoid accidental actuation or initiation of the sensor.

Figure 3:
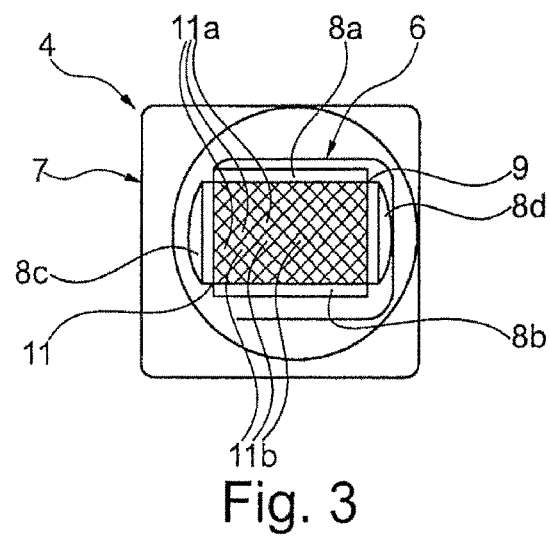
FIG. 3 shows a schematic front view of a sensor unit.

A sensor element 4 is illustrated in more detail in FIG. 3. An electrode arrangement 6 is here housed in a non-conductive housing 7 made, for example, of plastic. The electrode arrangement 6 is preferably a multi-layer circuit board with a plurality of electrically insulated conductive tracks consisting, for example, of copper.

The electrode arrangement 6 comprises a plurality of probe electrodes 8a, 8b, 8c, 8d, arranged separately from one another. The probe electrodes are preferably formed in a topmost conductive layer by means, for example, of etching or, for example, of milling, in particular, in the form of strips, and insulated from one another. Preferably the probe electrodes 8a, 8b, 8c, 8d are arranged around a central surface region 9, wherein, in particular, two of the probe electrodes 8a, 8b, 8c, 8d at a time are located opposite one another with respect to the central surface region 9. A field electrode 11 is arranged in a plane behind the rear side of the probe electrodes 8a, 8b, 8c, 8d, extending over amongst other things the central surface region 9 between the electrodes 8a, 8b, 8c, 8d in the background.

If the probe electrodes 8a-8d are formed, for example, on a single-layer circuit board, the central surface region 9 can be cut out of the circuit board, for example, in the form, in particular, of a rectangular window. The field electrode can then be formed in a material-saving manner in the form of a mesh of conductive wires woven together or of conductive strips 11a and 11b.

Preferably the dimensions of the probe electrodes 8a-8d and their distances from one another are appropriate for the body, in particular, the bodily part, that is intended for actuation of the sensor element 4. For example, the sensor elements 4 shown in FIGS. 1 and 2 can be provided for actuation by a finger, in particular, by a fingertip. In particular, the fingertip can be moved at a surface of the front panel 3a, close to the sensor element 4, where it may be the case that an electric field strength generated by the field electrode 11 in the space in front of the front panel 3a is sufficiently strong for touching the front panel 3a to be able to be avoided. The electric field may be changed by an end of a finger-shaped body in such a way that the electric field strength can be distributed unevenly. The uneven field distribution can lead to movements of charge between the probe electrodes 8a-8d, which are measurable in the form of currents by a detection unit (not shown). In contrast to this, while an entire hand, in particular, when the fingers are close to one another, can influence a field profile as a whole, as a result of the size relationships in respect, for example, of one finger, it can hardly give rise to any change in the electric field distribution between the probe electrodes 8a-8d, or not to an uneven change.

The field electrode 11 can be placed, for example, with the aid of the detection unit (not shown) at an electrical potential that creates an electric field detectable outside the piece of furniture 1. As a result of the electric potential generated by the field electrode 11, charge movements are induced by influence in the probe electrodes 8a to 8d, which depend on the field distribution of the electric field strength that is generated by the field electrode 11. Each of the probe electrodes 8a to 8d is preferably joined to the detection unit separately from the other electrodes, and connected to the detection unit in such a way that changes in the charge state can be detected separately at each of the electrodes 8a to 8d.

The change in the charge state can hear arise as a result of a change in the electric field in the detection region when a dielectric body is introduced into the detection region or removed from it. An electric current is associated with a change in an induced charge in one of the probe electrodes 8a to 8d, which is, for example, measurable in the detection unit, and whose course over time may allow a movement of the dielectric body in the detection region to be followed.

Figure 4:
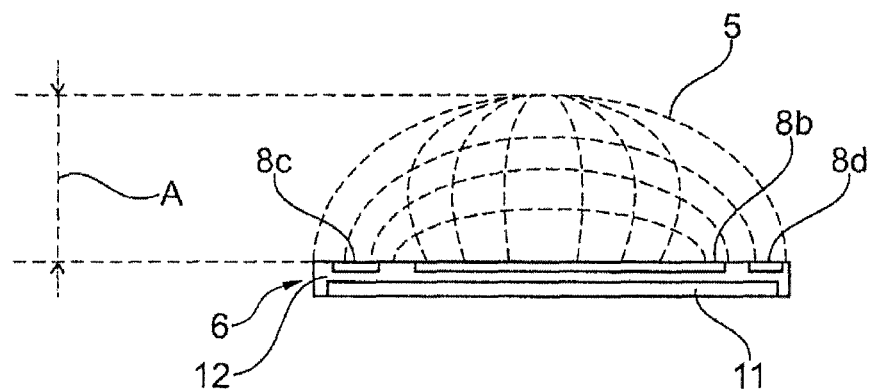
FIG. 4 shows a schematic side view of an electrode arrangement.

An electrode arrangement 6, which is preferably manufactured from a circuit board, is shown in more detail in FIG. 4. A plurality of probe electrodes, preferably electrically insulated from one another, made, for example, of copper are formed on a top face of a carrier layer 12, of which probe electrodes 8b, 8c and 8d are illustrated in the figure. A field electrode 11 is formed on the lower face of the carrier layer 12. The field electrode 11 can comprise two layers (not shown) that are electrically insulated from one another, of which an upper layer lies at a raised electric potential generating a field, and thus is at a different voltage from a second layer. The second layer can, for example, be connectable to a ground potential of an electric supply network. The equipotential lines 5 make it clear that with a two-layer, two-pole field electrode 11 of this sort, an electric field in the surrounding region of the electrode arrangement largely only extends over the upper face of the carrier layer 12. The distance A here marks a limit up to which an electric field is made available starting from the surface of the electrode arrangement 6, with which an actuation is possible, for example, by a finger or, for example, by a hand. The electric field can be screened at an underside of the electrode arrangement 6 by a grounded screen. This offers the advantage that an electronic circuit arranged in the screened region, for example, a microelectronic component, can be screened from EMC influences of the electrode arrangement 6, and thus protected from damage or from faulty function.

Figure 5:
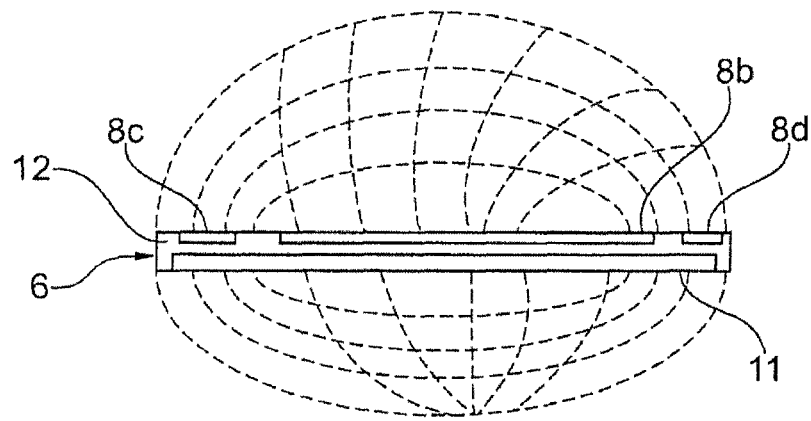
FIG. 5 shows a schematic side view of a further electrode arrangement.

FIG. 5 illustrates a second electrode arrangement 6 in more detail, in which only a single electrostatic potential is made available by a field electrode 11.

List of Reference Codes

1 Piece of furniture
2 Furniture compartment (open at the front side of the piece of furniture)
2a Wall element
2b Wall element
2c Wall element
2d Wall element
2f Face
2g Face
2h Face
3 Drawer
3a Front panel
3b Side wall
3c Rear wall
4 Sensor element
5 Equipotential line
6 Electrode arrangement
7 Housing
8a Probe electrode
8b Probe electrode
8c Probe electrode
8d Probe electrode
9 Surface area
11 Field electrode
11a Metal strip
11b Metal strip
12 Carrier layer

The invention claimed is:

1. A piece of furniture with a sensor device, the sensor device comprising:
an electrode arrangement which is arranged on a furniture section of the piece of furniture in such a way that, by using the electrode arrangement, changes in an electric field in a surrounding region, which is located at one side of the piece of furniture, can be detected with or without touching the electrode arrangement or the piece of furniture; and
a detection unit by which a position of a body in the surrounding region of the piece of furniture is determined by a detected change in the electric field;
wherein the electrode arrangement comprises a plurality of probe electrodes and at least one field electrode provided to generate the electric field in the surrounding region, wherein the probe electrodes are located on a first surface of a carrier element made of an insulating material in one layer in one plane of the electrode arrangement, and the at least one field electrode is located on an opposed second surface of the carrier element in another plane of the electrode arrangement that is parallel to the one plane and behind a rear side of the plurality of probe electrodes to define a layered structure.

2. The piece of furniture as claimed in claim 1, wherein the plurality of the probe electrodes are connected individually to the detection unit for separate detection.

3. The piece of furniture as claimed in claim 1, wherein the field electrode is connected for charging to the detection unit.

4. The piece of furniture as claimed in claim 1, wherein the probe electrodes are attached to the carrier element and separated from one another by electrically insulating material.

5. The piece of furniture as claimed in claim 4, wherein the field electrode is attached, electrically insulated, to the carrier element.

6. The piece of furniture as claimed in claim 1, wherein the carrier element is a circuit board.

7. The piece of furniture as claimed in claim 1, wherein the electrode arrangement is arranged on the body of the piece of furniture.

8. The piece of furniture as claimed in claim 1, wherein the electrode arrangement is arranged on a movable furniture section.

9. The piece of furniture as claimed in claim 1, wherein the electrode arrangement is embedded in a front panel.

10. The piece of furniture as claimed in claim 1, wherein the electrode arrangement is embedded in a cover plate.

11. The piece of furniture as claimed in claim 1, wherein a sequence of a plurality of positions of a dielectric body in the surrounding region can be assigned to an actuation signal by the detection unit.

12. The piece of furniture as claimed in claim 1, wherein the piece of furniture comprises an actuator that is connected to the sensor device for an actuation.

* * * * *

UNITED STATES PATENT AND TRADEMARK OFFICE
CERTIFICATE OF CORRECTION

PATENT NO.         : 10,398,227 B2                              Page 1 of 1
APPLICATION NO.    : 15/430886
DATED              : September 3, 2019
INVENTOR(S)        : Ronald Liebsch It is certified that error appears in the above-identified patent and that said Letters Patent is hereby corrected as shown below:

On the Title Page

Foreign Application Priority Data, Item (30):
Please change: "Jul. 21, 2014 (DE).... 20 2014 103 874"
To:
-- Aug. 21, 2014 (DE).... 20 2014 103 874 --

Signed and Sealed this
Twenty-first Day of January, 2020

Andrei Iancu
*Director of the United States Patent and Trademark Office*